United States Patent [19]

Engquist

[11] 3,999,467
[45] Dec. 28, 1976

[54] PISTON CYLINDER ASSEMBLY

[75] Inventor: Arne Engquist, Enkoping, Sweden

[73] Assignee: AB Bahco Verktyg, Enkoping, Sweden

[22] Filed: Sept. 11, 1975

[21] Appl. No.: 612,442

Related U.S. Application Data

[63] Continuation of Ser. No. 448,898, March 7, 1974, abandoned, which is a continuation of Ser. No. 299,730, Oct. 24, 1972, abandoned.

[30] Foreign Application Priority Data

Oct. 24, 1972 Sweden .......................... 13659/72

[52] U.S. Cl. .......................... 92/160; 92/182; 92/249; 92/257; 92/258; 308/4 R
[51] Int. Cl.² .......................... F16J 1/02; F16J 1/08
[58] Field of Search ............ 92/132, 172, 182, 249, 92/250, 255, 257, 258, 159, 160; 308/4; 277/225

[56] References Cited

UNITED STATES PATENTS

| | | | |
|---|---|---|---|
| 680,465 | 8/1901 | Reynolds | 92/258 |
| 2,068,859 | 1/1937 | Jones et al. | 92/258 |
| 3,046,062 | 7/1962 | Wettstein | 92/257 X |
| 3,333,513 | 8/1967 | Wettstein | 308/4 X |
| 3,361,040 | 1/1968 | Chenault | 92/257 |
| 3,448,665 | 6/1969 | Allinquant | 92/240 X |
| 3,636,816 | 1/1972 | Hale | 92/240 |

FOREIGN PATENTS OR APPLICATIONS

| | | | |
|---|---|---|---|
| 49,834 | 5/1939 | France | 92/172 |
| 1,011,233 | 6/1957 | Germany | 92/172 |

*Primary Examiner*—Irwin C. Cohen
*Attorney, Agent, or Firm*—Stevens, Davis, Miller & Mosher

[57] ABSTRACT

A piston-cylinder assembly having a circumferential groove around the piston near the end of the piston facing the cylinder chamber, a cuff around the piston at a location more remote from said chamber from the groove, a guide ring mounted in the groove for slideably abutting the cylinder wall, the guide ring having a convex inner configuration and a generally cylindrical outer configuration.

3 Claims, 1 Drawing Figure

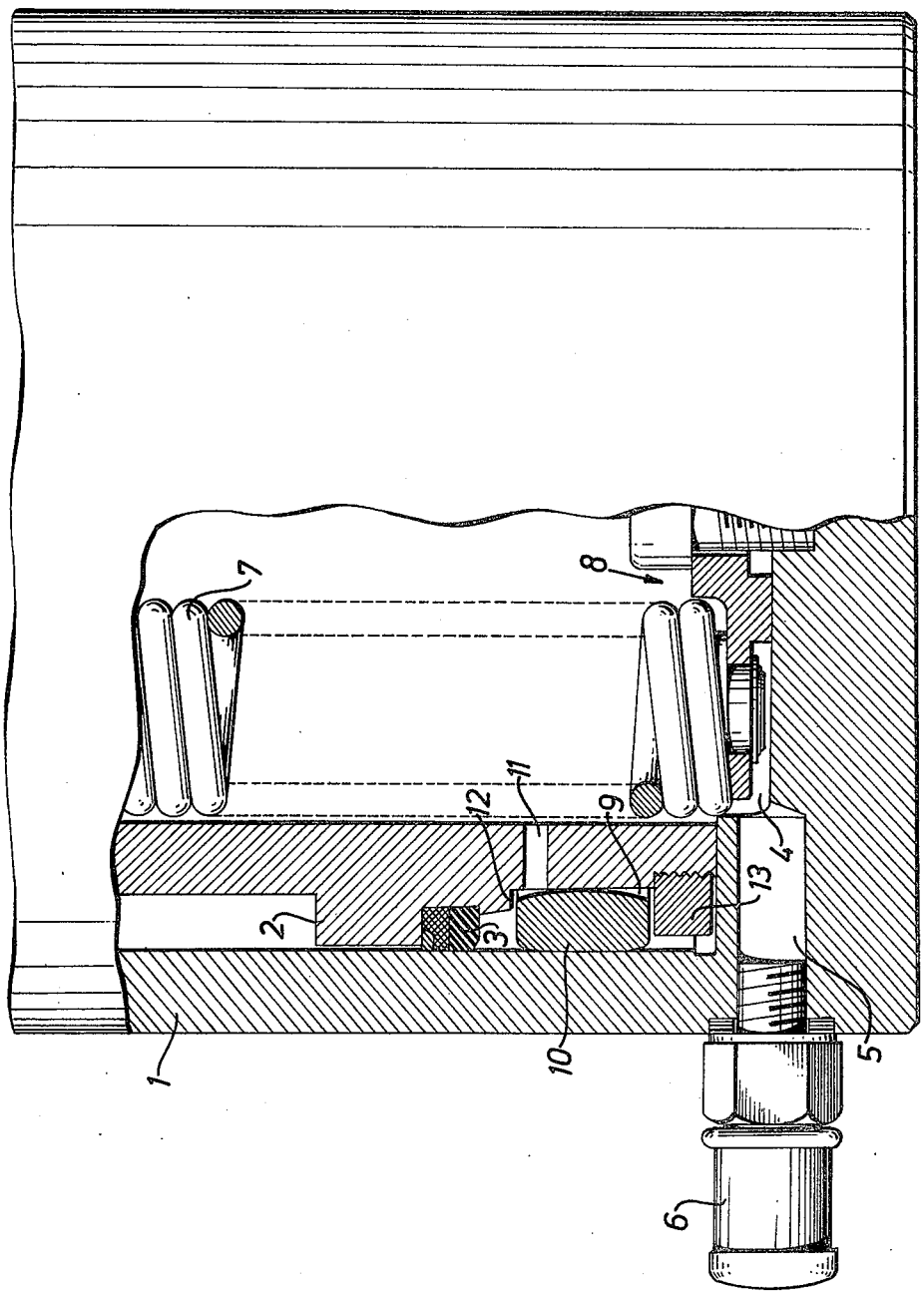

PISTON CYLINDER ASSEMBLY

This is a continuation of application Ser. No. 448,898 filed Mar. 7, 1974 which in turn is a continuation of Ser. No. 299,730 filed Oct. 24, 1972, both now abandoned.

The present invention relates to a piston-cylinder assembly having considerable clearance between piston and cylinder and having a flexible cuff mounted around the circumference of the piston to seal against the cylinder wall.

With known piston-cylinder assemblies of the type envisaged, the cuff is located close to the end of the piston towards the cylinder chamber, this arrangement normally giving no rise to problems. However, when the piston is unevenly loaded, e.g. as the result of a large pressure force acting obliquely to the piston axis or uncentered with respect to the same, the result may be jamming or binding.

The object of the present invention is to eliminate this tendency of jamming when the piston is unevenly loaded. Thus, the present invention relates to a piston-cylinder of the aforementioned type which is mainly characterized in that arranged in the piston between the cuff and the end of said piston facing the cylinder chamber is a circumferentially extending groove having a generally straight bottom profile, and that mounted in the groove is a guide ring having a generally cylindrical surface facing the cylinder wall and having a convex configuration at its surface engaging the bottom of said groove, said ring being arranged to slideably abut the wall of said cylinder.

The invention will now be described in more detail with reference to an embodiment thereof illustrated in the accompanying drawings, the single FIGURE of which is a partially cut away view of the pressure medium inlet end of a piston-cylinder assembly having a pressure exerting function, e.g. for use in the hydraulic system of a lifting jack.

The illustrated assembly has a cylinder 1 and a piston 2 moving therein. Mounted around the circumference of the piston is a sealing cuff 3 composed in a conventional manner of a number of rings of different material and being of sufficiently flexible construction to provide an efficient sealing effect, both when stationary and when sliding along the cylinder wall.

Pressure fluid is passed to the cylinder chamber 4 through a passage 5 arranged between the chamber and one half 6 of a quick connecting coupling, by means of which the assembly is connected to a hose from a source of pressure fluid not shown.

The piston 2 is of hollow construction and is open towards the bottom of the cylinder, to provide room for a number of tension springs 7, which serve to return the piston when the load on the pressure fluid is relieved. The springs are attached to the piston in a manner not shown and to the bottom of the cylinder by means of conventional attachment elements 8, which are incompletely shown in the drawing.

Arranged in the piston 2, between the cuff 3 and the end of the piston facing the cylinder chamber 4 is a circumferentially extending annular groove 9 in which a guide ring 10 is mounted for restricted movement. The guide ring may be made of steel or a plastic material which is relatively resistant to deformation and is arranged for sliding movement against the cylinder wall, without taking over the sealing function of such a cuff which otherwise usually should have been situated at this spot.

The outer surface of the ring 10 has a generally cylindrical configuration and the diameter of the ring is only slightly less than the inner diameter of the cylinder in the cylinder bore. As will be seen from the drawing, the ring 10 has a generally straight external profile. The inner surface of the ring, however, is convex in shape, such that only a central portion thereof is able to abut the bottom of the groove 9, the groove having a substantially straight profile.

A passage 11 extending between the bottom of the groove 9 and the inner cavity of the piston places the cylinder chamber 4 in communication with both the space between the bottom of the groove and the guide ring 10 and with the space between the cuff 3 and the guide ring, for pressure equalizing and lubricating purposes.

The defining wall of the groove located axially inwardly towards the cuff 3 comprises a fixed shoulder 12 produced by changing the diameter of the piston 2. The opposite groove defining wall located outwardly towards the end of the piston has the form of a lock ring 13 secured to a threaded portion of the end of the piston. The space located between the shoulder 12 and the lock ring 13 is sufficiently large to permit the guide ring 10 to be upset in its seating. The outer surface of the guide ring 10 towards the cylinder wall is gently rounded at both ends thereof. More specifically, when viewed in section, the ring presents an outer profile which is terminated with a large radius at the junction to respective end planes of the ring.

The described arrangement avoids such inclination of the mutual contact surfaces of co-acting sliding parts as to promote jamming or binding. The pressure forces occurring between the piston and cylinder wall with unevenly distributed loads are taken up by the guide ring 10, which allows a certain degree of misalignment of the piston without jeopardizing the sliding contact with the cylinder wall. The permitted degree of piston misalignment can be selected by adapting the lateral movability of the co-acting parts; primarily by adapting the extent to which the guide ring 10 can move in the groove 9. This degree of movability is increased by giving the ring an inner profile of convex configuration. Non-desirable secondary effects of the ring 10 with respect to the sealing function of the cuff 3 are avoided by means of the passage 11. The arrangement of the lock ring 13 to form one defining wall of the groove 9 enables the cuff and the guide ring to be mounted in position with relative ease and enables the same to be quickly changed when necessary.

I claim:
1. A piston cylinder assembly comprising:
    a cylinder having a wall defining a chamber therein,
    a piston in said cylinder chamber with considerable play between said piston and said cylinder, said piston being hollow and open at one end thereof which faces the cylinder chamber,
    a flexible cuff mounted around the circumference of the piston near the one end thereof facing the cylinder chamber to seal against the cylinder wall,
    means defining a circumferentially extending groove in said piston near the one end thereof facing the cylinder chamber, said groove being between said cuff and the one end of said piston facing the cylinder chamber, said groove having a straight bottom profile and radially extending side walls and opening outwardly toward the cylinder wall, a deformation resistant, continuous, uniform guide ring in said groove and slidably abutting the cylinder wall, said guide ring having an outer cylindrical surface abutting the cylinder wall and an inner surface, convex in transverse cross-section, abutting the bottom of said groove, means defining a passage in said piston, one end of said passage opening into the bottom of said groove and the other end thereof opening into the hollow of the piston facing the cylinder chamber whereby the cylinder chamber is in fluid communication with both a space between the bottom of the groove and the guide ring and a space between the cuff and the guide ring, a lock ring secured to said one end of said piston, said lock ring having an annular end wall which defines the side of said groove closest to said one end of said piston, and the axial length of said groove is longer than the axial length of said guide ring so that said guide ring may move axially in said groove with respect to said piston.

2. An assembly according to claim 1, characterized in that the outer surfaces of the guide ring facing the cylinder wall are gently rounded at both ends of the ring.

3. A piston cylinder assembly as claimed in claim 1, further comprising means threadingly securing; said lock ring to said one end of said piston.

* * * * *